(12) United States Patent
Garduno et al.

(10) Patent No.: US 10,036,294 B2
(45) Date of Patent: Jul. 31, 2018

(54) AFTERTREATMENT MODULE WITH REDUCED BYPASS FLOW

(71) Applicant: Caterpillar Inc., Peoria, IL (US)

(72) Inventors: Juan A. Garduno, Dunlap, IL (US); James Deason, Daingerfield, TX (US); Julian Justin, Peoria, IL (US); R. Zachary Richey, Peoria, IL (US); Ling Deng, Dunlap, IL (US); James D. Peltier, West Lafayette, IN (US)

(73) Assignee: Caterpillar Inc., Deerfield, IL (US)

(*) Notice: Subject to any disclaimer, the term of this patent is extended or adjusted under 35 U.S.C. 154(b) by 393 days.

(21) Appl. No.: 14/724,438

(22) Filed: May 28, 2015

(65) Prior Publication Data
US 2016/0348558 A1   Dec. 1, 2016

(51) Int. Cl.
*F01N 3/20* (2006.01)
*F01N 3/28* (2006.01)
*B01D 53/94* (2006.01)

(52) U.S. Cl.
CPC ......... *F01N 3/2066* (2013.01); *F01N 3/2839* (2013.01); *B01D 53/944* (2013.01); *B01D 53/9418* (2013.01); *B01D 53/9472* (2013.01); *B01D 2255/9035* (2013.01); *B01D 2258/012* (2013.01); *B01D 2258/018* (2013.01); *B01D 2259/4566* (2013.01); *F01N 2450/02* (2013.01); *F01N 2450/30* (2013.01); *F01N 2590/10* (2013.01); *Y02T 10/24* (2013.01)

(58) Field of Classification Search
None
See application file for complete search history.

(56) References Cited

U.S. PATENT DOCUMENTS

| 5,409,670 A | 4/1995 | Jaynes et al. |
|---|---|---|
| 8,756,913 B2 | 6/2014 | Liu et al. |
| 2004/0009874 A1* | 1/2004 | Koike ............... B01D 53/8631 502/439 |
| 2014/0044612 A1 | 2/2014 | Baig et al. |
| 2014/0174060 A1 | 6/2014 | Baig et al. |
| 2014/0248186 A1 | 9/2014 | Denis et al. |
| 2015/0023843 A1 | 1/2015 | Driscoll et al. |

FOREIGN PATENT DOCUMENTS

| WO | 2011053013 A2 | 5/2011 |
|---|---|---|
| WO | 2012096675 A1 | 7/2012 |
| WO | 2014166076 A1 | 10/2014 |

\* cited by examiner

*Primary Examiner* — Walter D. Griffin
*Assistant Examiner* — Jelitza M Perez
(74) *Attorney, Agent, or Firm* — Miller, Matthias & Hull (57) ABSTRACT

An aftertreatment module includes a catalytic brick having upstream and downstream flanges sized to extend over potential leak flow paths between bricks. Additionally, an aftertreatment module has an array of similarly flanged bricks to reduce leakage through all interfaces between adjacent bricks. A frame for holding the array of bricks includes flow modulators to restrict leakage through an interface between the frame and at least one side surface defined by the array of bricks.

12 Claims, 11 Drawing Sheets

AFTERTREATMENT MODULE WITH REDUCED BYPASS FLOW

TECHNICAL FIELD

The present disclosure generally relates to aftertreatment systems, and more particularly to reducing exhaust flow from bypassing catalytic modules used in aftertreatment systems.

BACKGROUND

Power systems such as large internal combustion engines, for example, burn hydrocarbon-based fuels or similar fuel sources to convert the chemical energy therein to mechanical energy for powering an associated machine or application. Combustion of the hydrocarbon fuel may release or create several byproducts or emissions, such as nitrogen oxides ($NO_x$), carbon monoxides and carbon dioxides (CO and $CO_2$), and particulate matter. The quantity of some of these emissions that may be released to the environment may be subject to government regulations and environmental laws. Accordingly, manufacturers of such power systems may equip the system with an associated aftertreatment system to treat the emissions before they are discharged to the environment.

The aftertreatment system can be disposed in the exhaust channel of the power system and may include a unit or module through which the exhaust gasses may pass. The module may include one or more aftertreatment bricks that can change, chemically or physically, the composition of the exhaust gasses that encounter the bricks. Examples of aftertreatment bricks include catalysts that chemically alter the exhaust gasses and filters that can trap specific components of the exhaust gasses. In some embodiments, the aftertreatment brick may be permanently fixed to the module, such as by welding or the like. However, some types of aftertreatment bricks may become depleted or deactivated after a period of use, or may become damaged due to the conditions in which they are used, and require replacement. Accordingly, in some aftertreatment systems the aftertreatment bricks may be removable.

Some aftertreatment systems may use an array of catalytic bricks positioned adjacent one another to handle the desired volume of exhaust gas. For example, U.S. Pat. No. 5,409,670 (the '670 patent) discloses a selective catalytic reduction system having multiple pairs of catalytic members arranged in series. The '670 patent describes flanges attached to a mid-portion of each catalytic member that are sandwiched between a clamping plate and a sealing surface of an internal frame. While this arrangement attempts to reduce exhaust leakage between the catalytic member and the internal frame, it requires careful positioning of the catalytic member to ensure that the flange is located for proper clamping. Additionally, the system described in the '670 patent introduces potential leak paths between adjacent catalytic members.

SUMMARY OF THE DISCLOSURE

In accordance with one aspect of the present disclosure, a catalytic brick is provided for use in an aftertreatment system having a catalytic module frame defining a frame aperture. The catalytic brick includes a brick mantle having first, second, third, and fourth side walls extending from a brick mantle upstream end to a brick mantle downstream end, the first side wall being adjacent to the second side wall, the brick mantle defining a brick mantle aperture, and a catalyst material is disposed in the brick mantle aperture. The brick further includes a first upstream flange extending outwardly from the first side wall of the brick mantle at the brick mantle upstream end, a first downstream flange extending outwardly from the first side wall of the brick mantle at the brick mantle downstream end, a second upstream flange extending outwardly from the second side wall of the brick mantle at the brick mantle upstream end, and a second downstream flange extending outwardly from the second side wall of the brick mantle at the brick mantle downstream end.

In accordance with another aspect of the present disclosure, an array of catalytic bricks is provided for an aftertreatment system. The array includes a first catalytic brick having a first brick mantle having a first side wall extending from a first brick mantle upstream end to a first brick mantle downstream end, the first brick mantle defining a first brick mantle aperture, and a catalyst material disposed in the first brick mantle aperture. A second catalytic brick is disposed adjacent the first side wall of the first brick mantle and includes a second brick mantle having a first side wall disposed toward the first side wall of the first brick mantle, the first side wall of the second brick mantle and the first side wall of the first brick mantle defining a first brick interface between the first catalytic brick and the second catalytic brick, the second brick mantle defining a second brick mantle aperture, a catalyst material disposed in the second brick mantle aperture, a first upstream flange extending outwardly from the first side wall of the second brick mantle at the second brick mantle upstream end, and a first downstream flange extending outwardly from the first side wall of the second brick mantle at the second brick mantle downstream end. The first downstream flange is sufficiently spaced from the first upstream flange to receive the first side wall of the first brick mantle, and each of the first upstream flange and the first downstream flange being configured to traverse the first brick interface between the first catalytic brick and the second catalytic brick.

In accordance with another aspect of the present disclosure, a catalytic module is provided for an aftertreatment system, the catalytic module including a catalytic module frame defining a frame aperture, a first frame wall of the catalytic module bordering on the frame aperture, and a catalyst assembly disposed in the frame aperture, the catalyst assembly including a mantle having a first side wall disposed toward the first frame wall, the first side wall of the mantle and the first frame wall defining a first frame interface between the catalyst assembly and the catalytic module frame, the mantle defining a mantle aperture holding a catalyst material. A first flow modulator is slidably coupled to the catalytic module frame, the first flow modulator having a body panel defining an inner edge disposed toward the frame aperture, the first flow modulator being movable relative to the catalytic module frame in a first sliding direction to engage the inner edge of the first flow modulator with the first side wall of the mantle so that the body panel of the first flow modulator traverses the first frame interface between the catalyst assembly and the catalytic module frame.

In accordance with another aspect of the present disclosure, which may be combined with any of the other aspects, the first and third walls of the mantle are spaced from and substantially parallel to each other, and in which the second and fourth walls of the mantle are spaced from and substantially parallel to each other.

In accordance with another aspect of the present disclosure, which may be combined with any of the other aspects, the brick mantle has a substantially square profile.

In accordance with another aspect of the present disclosure, which may be combined with any of the other aspects, each of the first and second upstream flanges and the first and second downstream flanges is formed of steel.

In accordance with another aspect of the present disclosure, which may be combined with any of the other aspects, each of the first and second upstream flanges and the first and second downstream flanges is welded to the brick mantle.

In accordance with another aspect of the present disclosure, which may be combined with any of the other aspects, the first downstream flange is sufficiently spaced from the first upstream flange to receive a side wall of a second brick having a second brick mantle configured the same as the brick mantle.

In accordance with another aspect of the present disclosure, which may be combined with any of the other aspects, the second downstream flange is sufficiently spaced from the second upstream flange to receive a side wall of a third brick having a third brick mantle configured the same as the brick mantle.

In accordance with another aspect of the present disclosure, which may be combined with any of the other aspects, the second brick mantle further comprises a second side wall adjacent the first side wall, and the second catalytic brick further includes a second upstream flange extending outwardly from the second side wall of the second brick mantle at the second brick mantle upstream end, and a second downstream flange extending outwardly from the second side wall of the second brick mantle at the second brick mantle downstream end.

In accordance with another aspect of the present disclosure, which may be combined with any of the other aspects, a third catalytic brick is disposed adjacent the second side wall of the second brick mantle and includes a third brick mantle having a first side wall extending from a third brick mantle upstream end to a third brick mantle downstream end, the third brick mantle defining a third brick mantle aperture, a catalyst material disposed in the third brick mantle aperture, the second side wall of the second brick mantle and the first side wall of the third brick mantle defining a second brick interface between the second catalytic brick and the third catalytic brick, the second downstream flange being sufficiently spaced from the second upstream flange to receive the first side wall of the third brick mantle, and each of the second upstream flange and the second downstream flange are configured to traverse the second brick interface between the second catalytic brick and the third catalytic brick.

In accordance with another aspect of the present disclosure, which may be combined with any of the other aspects, the first side wall of the second brick mantle extends vertically and the second side wall of the second brick mantle extends horizontally.

In accordance with another aspect of the present disclosure, which may be combined with any of the other aspects, in which the first flow modulator includes a connection end coupled to the catalytic module frame, the connection end including at least one elongate slot extending parallel to the to the first sliding direction and sized to receive a fastener configured to releasably secure the first flow modulator to the catalytic module frame.

In accordance with another aspect of the present disclosure, which may be combined with any of the other aspects, the first flow modulator is formed of a stainless steel material.

In accordance with another aspect of the present disclosure, which may be combined with any of the other aspects, the catalyst assembly comprises an array of catalytic bricks, each catalytic brick having a brick mantle, and in which the mantle of the catalyst assembly comprises the brick mantles of the catalytic bricks.

In accordance with another aspect of the present disclosure, which may be combined with any of the other aspects, the catalytic module frame includes a second frame wall bordering on the frame aperture, the mantle of the catalyst assembly includes a second side wall disposed toward the second frame wall, the second side wall of the mantle and the second frame wall defining a second frame interface between the catalyst assembly and the catalytic module frame, and the catalytic module further includes a second flow modulator slidably coupled to the catalytic module frame, the second flow modulator having a body panel defining an inner edge disposed toward the frame aperture, the second flow modulator being movable relative to the catalytic module frame in a second sliding direction different from the first sliding direction to engage the inner edge of the second flow modulator with the second side wall of the mantle so that the body panel of the second flow modulator traverses the second frame interface between the catalyst assembly and the catalytic module frame.

In accordance with another aspect of the present disclosure, which may be combined with any of the other aspects, the second flow modulator includes a connection end coupled to the catalytic module frame, the connection end including at least one elongate slot extending parallel to the to the second sliding direction and sized to receive a fastener configured to releasably secure the second flow modulator to the catalytic module frame.

In accordance with another aspect of the present disclosure, which may be combined with any of the other aspects, each of the first flow modulator and second flow modulator is formed of a stainless steel material.

In accordance with another aspect of the present disclosure, which may be combined with any of the other aspects, the catalyst assembly comprises an array of catalytic bricks, each catalytic brick having a brick mantle, and in which the mantle of the catalyst assembly comprises the brick mantles of the catalytic bricks.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Embodiments of catalytic modules for use in aftertreatment systems, as well as catalytic bricks used in catalytic modules, are disclosed herein. The catalytic modules and bricks are configured to reduce the amount of exhaust gas leaking around the catalytic bricks. In some embodiments, the catalytic bricks include integral flanges extending across interfaces between adjacent catalytic bricks. In other embodiments, the catalytic module includes a frame having one or more flow modulators extending from the frame to the catalytic bricks.

Figure 1:
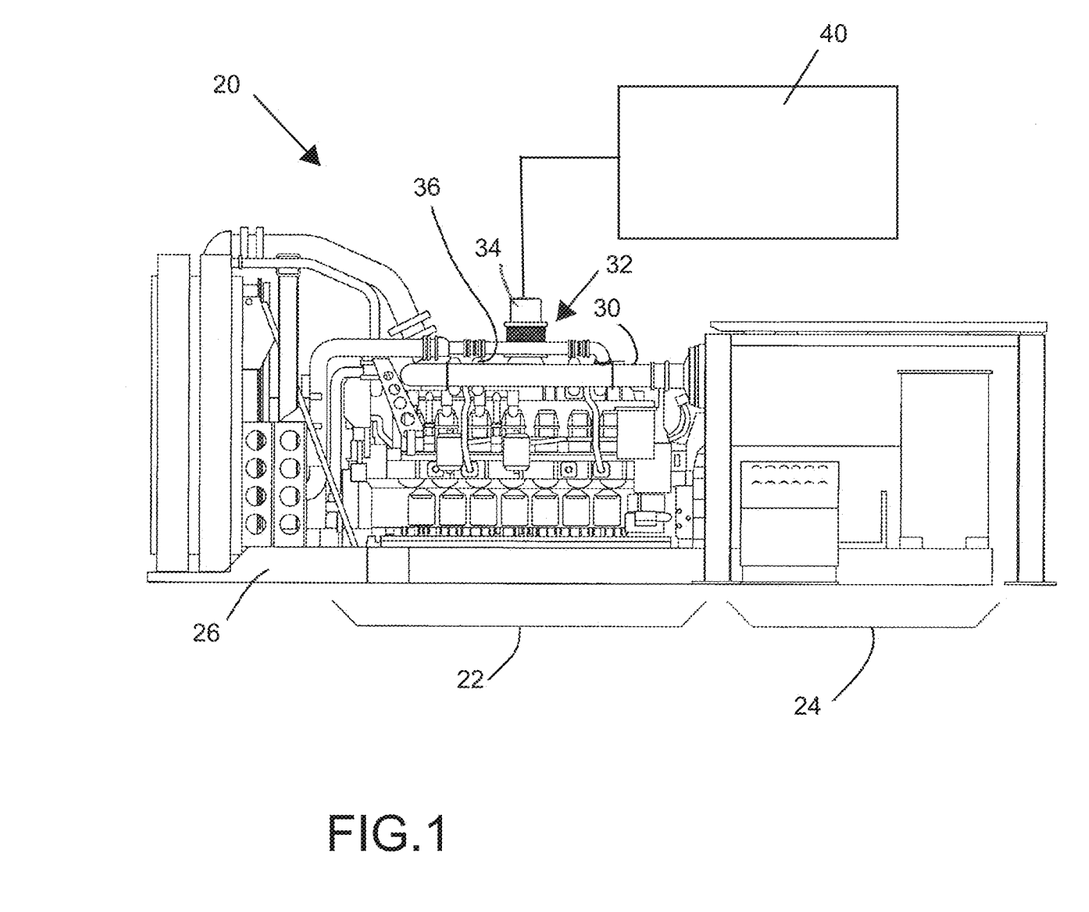
FIG. 1 is a side elevational view of a power system including an internal combustion engine coupled to a generator and associated with an aftertreatment system.

This disclosure relates generally to an exhaust aftertreatment system that may be associated with a power system producing exhaust gasses and, more particularly, relates to aftertreatment bricks that may be a removable component of such aftertreatment systems. FIG. 1 illustrates an exemplary power system 20 that can generate power by combusting fossil fuels or the like. The illustrated power system 20 may include an internal combustion engine 22, such as a diesel engine operatively coupled to a generator 24 for producing electricity. The internal combustion engine 22 may have any number of cylinders as may be appreciated by one of ordinary skill in the art. The internal combustion engine 22 and the generator 24 can be supported on a common mounting frame 26. The power system 20 can provide on-site stand-by power or continuous electrical power at locations where access to an electrical grid is limited or unavailable. Accordingly, the generator 24 and internal combustion engine 22 can be scaled or sized to provide suitable wattage and horsepower. It should be appreciated that in other embodiments, the power system of the present disclosure can be utilized in other applications such as gasoline burning engines, natural gas turbines, and coal burning systems. Further, in addition to stationary applications, the present disclosure can be utilized in mobile applications such as locomotives and marine engines.

To direct intake air into and exhaust gas from the power system 20, the power system can include an air introduction system 30 and an exhaust system 32. The air introduction system 30 introduces air or an air/fuel mixture to the combustion chambers of the internal combustion engine 22 for combustion while the exhaust system 32 includes an exhaust pipe or exhaust channel 34 in fluid communication with the combustion chambers to direct the exhaust gasses produced by the combustion process to the environment. To pressurize intake air by utilizing the positive pressure of the expelled exhaust gasses, the power system 20 can include one or more turbochargers 36 operatively associated with the air introduction system 30 and the exhaust system 32.

An exhaust aftertreatment system 40 may fluidly communicate with the exhaust channel 34 to receive and treat the exhaust gasses generated by the power system 20 before discharge to the environment. The term "aftertreatment" refers to the fact that the system treats exhaust gasses after they have been produced and is therefore distinguishable from fuel additives and the like that affect the combustion process. The aftertreatment system 40 can be designed as a separate unit that can be mounted above the power system 20 and can receive exhaust gasses from the exhaust channel 34. By manufacturing the aftertreatment system 40 as a separate modular unit, the design can be utilized with different sizes and configurations of the power system 20. However, in other embodiments, the aftertreatment system 40 can be integral with the power system 20 and can be disposed at other locations rather than above the power system. The aftertreatment system 40 can be configured to treat, remove or convert regulated emissions and other constituents in the exhaust gasses.

Figure 2:
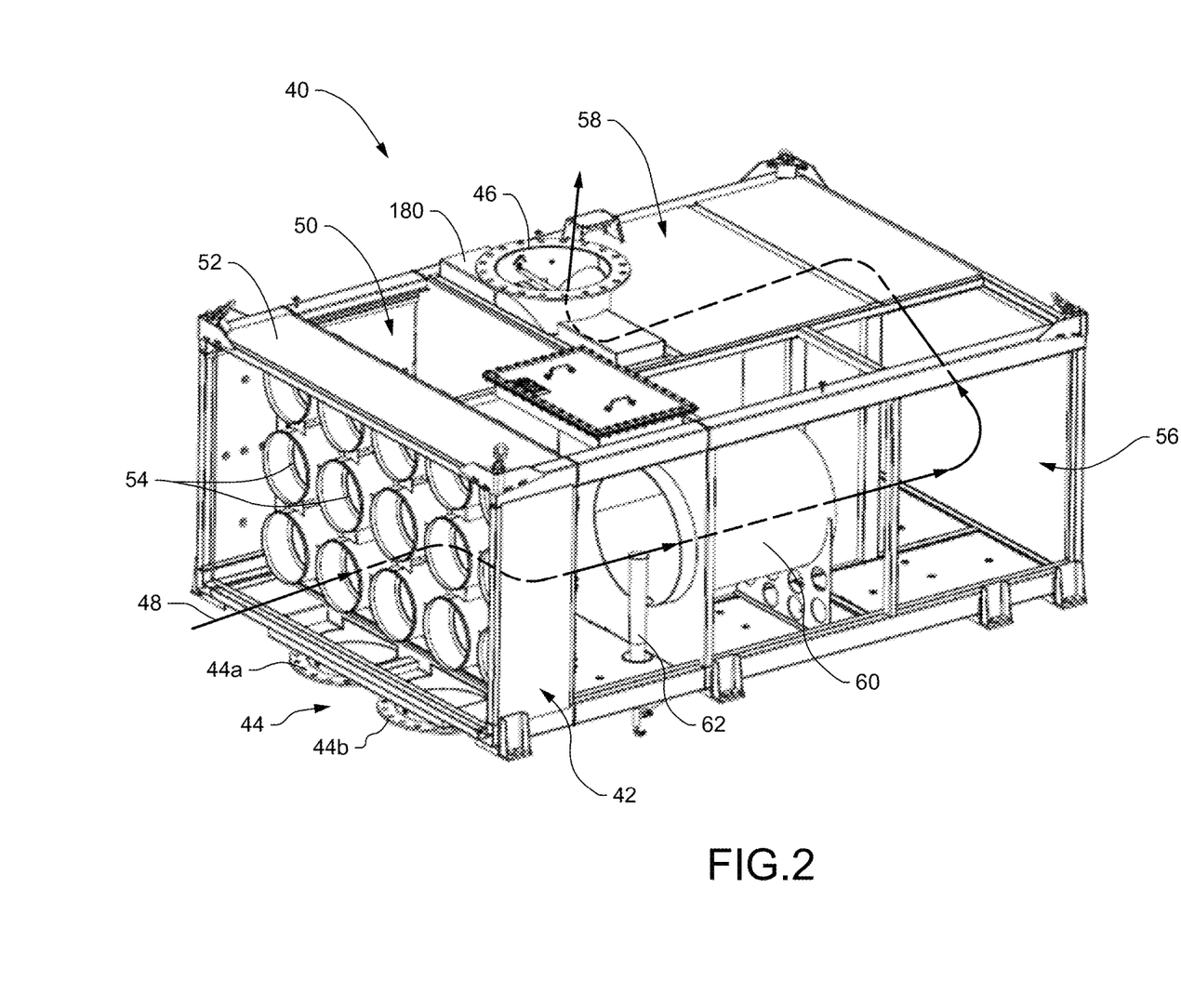
FIG. 2 is a first perspective view of the aftertreatment system of FIG. 1 with portions removed for clarity.
Figure 3:
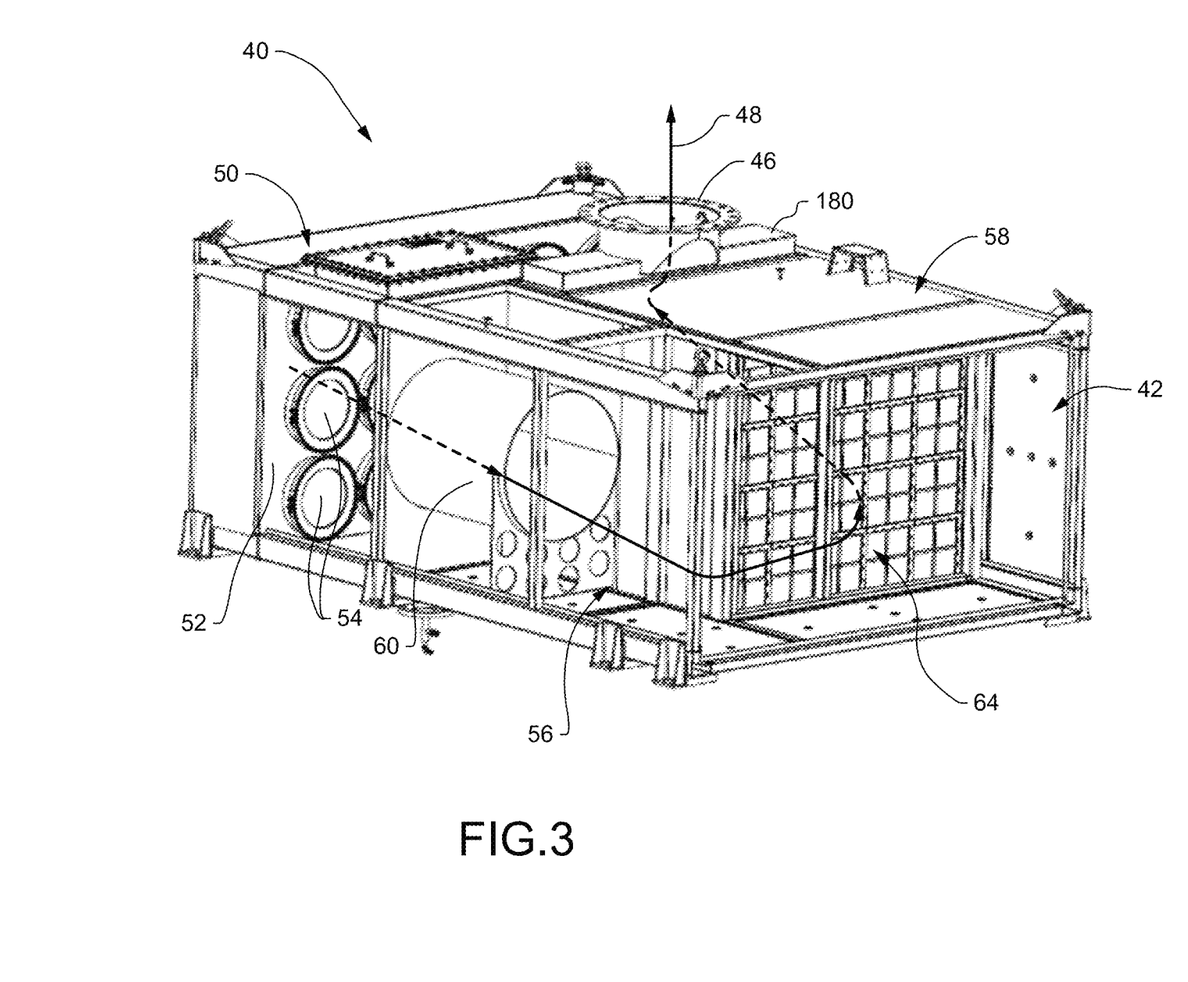
FIG. 3 is a second perspective view of the aftertreatment system of FIG. 1 with portions removed for clarity.

As shown in greater detail in FIGS. 2 and 3, the aftertreatment system 40 includes a housing 42 defining an inlet 44 (shown herein as a pair of inlets 44a, 44b) and an outlet 46. Exhaust gasses generally follow an exhaust gas flow path, identified by arrow 48, from the inlet 44 to the outlet 46. The housing 42 may further define a first chamber 50 containing a bulkhead 52. The bulkhead 52 may support a plurality of initial aftertreatment modules 54 through which the exhaust gas flow is directed. The initial aftertreatment modules 54 may be provided as Diesel Particulate Filters (DPFs) which remove certain solids from the exhaust gasses, Oxidation Catalysts (OCs) which promote oxidation of several exhaust gas pollutants by oxygen, or other types of initial aftertreatment modules used in aftertreatment systems.

A second chamber 56 may be located downstream of the first chamber 50 for housing components of a selective catalytic reduction (SCR) system 58. A mixing tube 60 may be provided through which the exhaust gasses travel as they transition from the first chamber 50 to the second chamber 56. A reductant injector 62 is positioned upstream of the mixing tube 60 and is operatively coupled to a source of reductant agent (not shown). The reductant injector 62 may periodically or continuously inject a measure of the reductant agent into the exhaust gas stream in a process sometimes referred to as dosing. The amount of reductant agent introduced is dependent upon the $NO_X$ load of the exhaust gasses. Common reductant agents include urea ($(NH_2)_2CO$) and ammonia ($NH_3$). In one embodiment, the reductant agent is an aqueous urea containing approximately 66.66% water and 33.33% urea. The mixing tube 60 may have a tube diameter selected such that is increases the velocity at which the exhaust gasses travel, thereby to increase turbulence in the exhaust gas and more thoroughly mix the exhaust gasses with the reductant agent.

A catalytic module 64 may be disposed in the second chamber 56 to reduce $NO_X$ emissions through an SCR reaction process. Referring to FIGS. 3-6, the exemplary catalytic module 64 generally includes a catalytic module frame 66 defining a frame aperture 68 and a catalytic assembly 70 disposed in the frame aperture 68. The catalytic module frame 66 includes first, second, third, and fourth frame walls 72, 74, 76, 78, each of which borders on and defines the frame aperture 68. In the illustrated embodiment, the frame walls 72, 74, 76, 78 are constructed to give the catalytic module frame 66 and the frame aperture 68 rectangular or square shapes.

Figure 4:
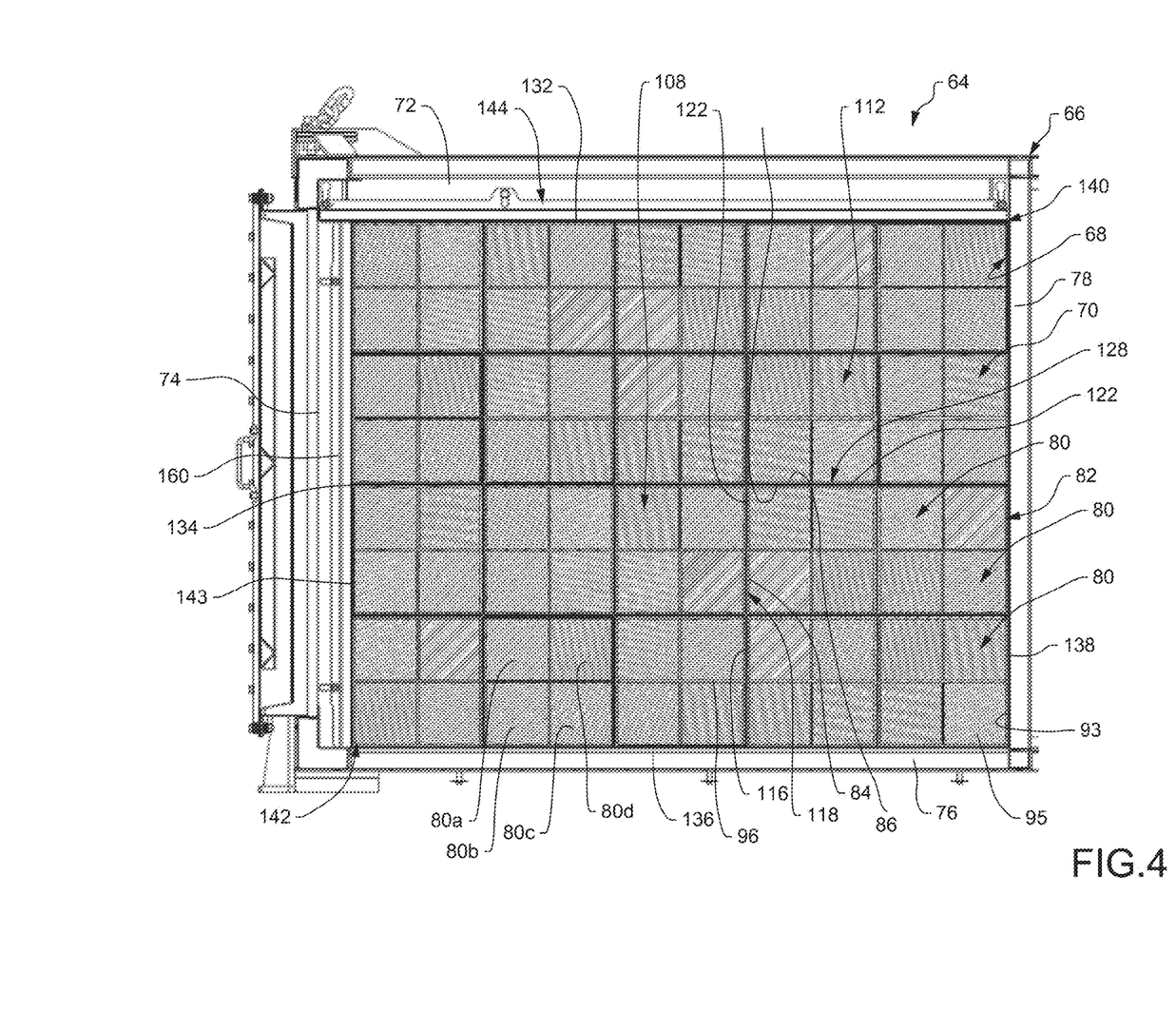
FIG. 4 is a side elevational view of a catalytic module used in the aftertreatment system of FIGS. 2 and 3.
Figure 6:
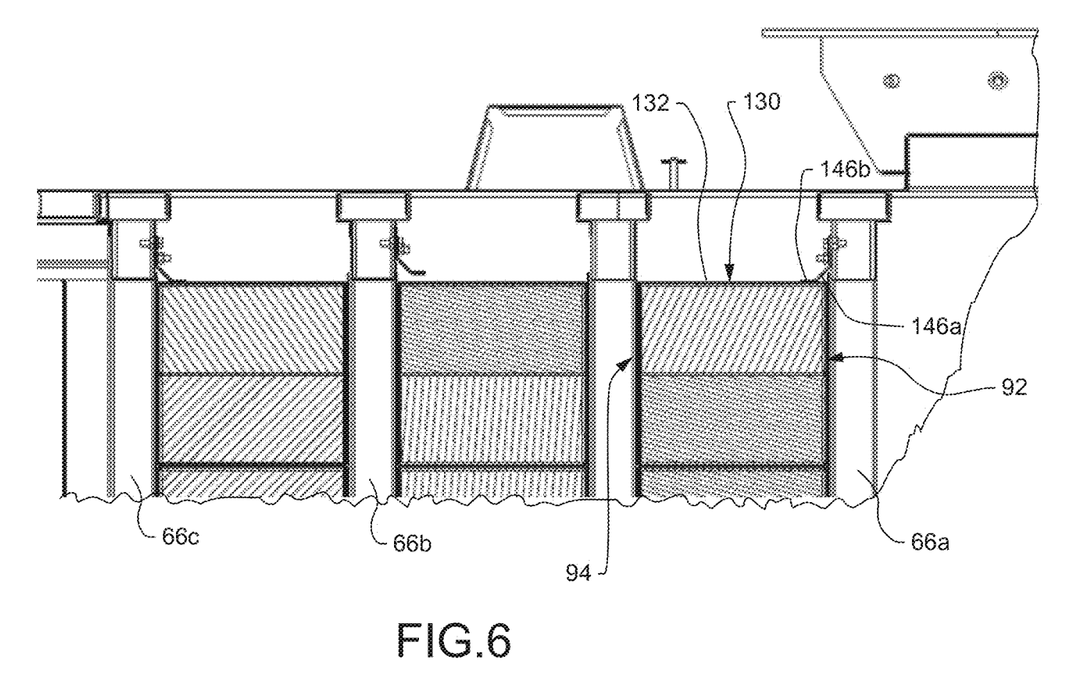
FIG. 6 is an enlarged side view, in cross-section, of a portion of the catalytic module of FIG. 4.

The catalytic assembly 70 may include an array of catalytic bricks 80 in which the SCR reduction process takes place. As shown in FIG. 4, an array of twenty catalytic bricks 80 is provided in a five-by-four pattern. Array configurations other than five-by-four may be used without departing from the scope of this disclosure. Furthermore, while a single catalytic module frame 66 and associated catalytic assembly 70 are shown, it will be appreciated that the catalytic module 64 may include multiple catalytic module frames 66 and catalytic assemblies 70 arranged in parallel or series along the exhaust gas flow path 48. In the illustrated embodiment, for example, the catalytic module 64 includes three catalytic module frames 66a, 66b, 66c positioned in series, each frame holding a five-by-four array of catalytic bricks 80 (FIG. 6).

Figure 5:
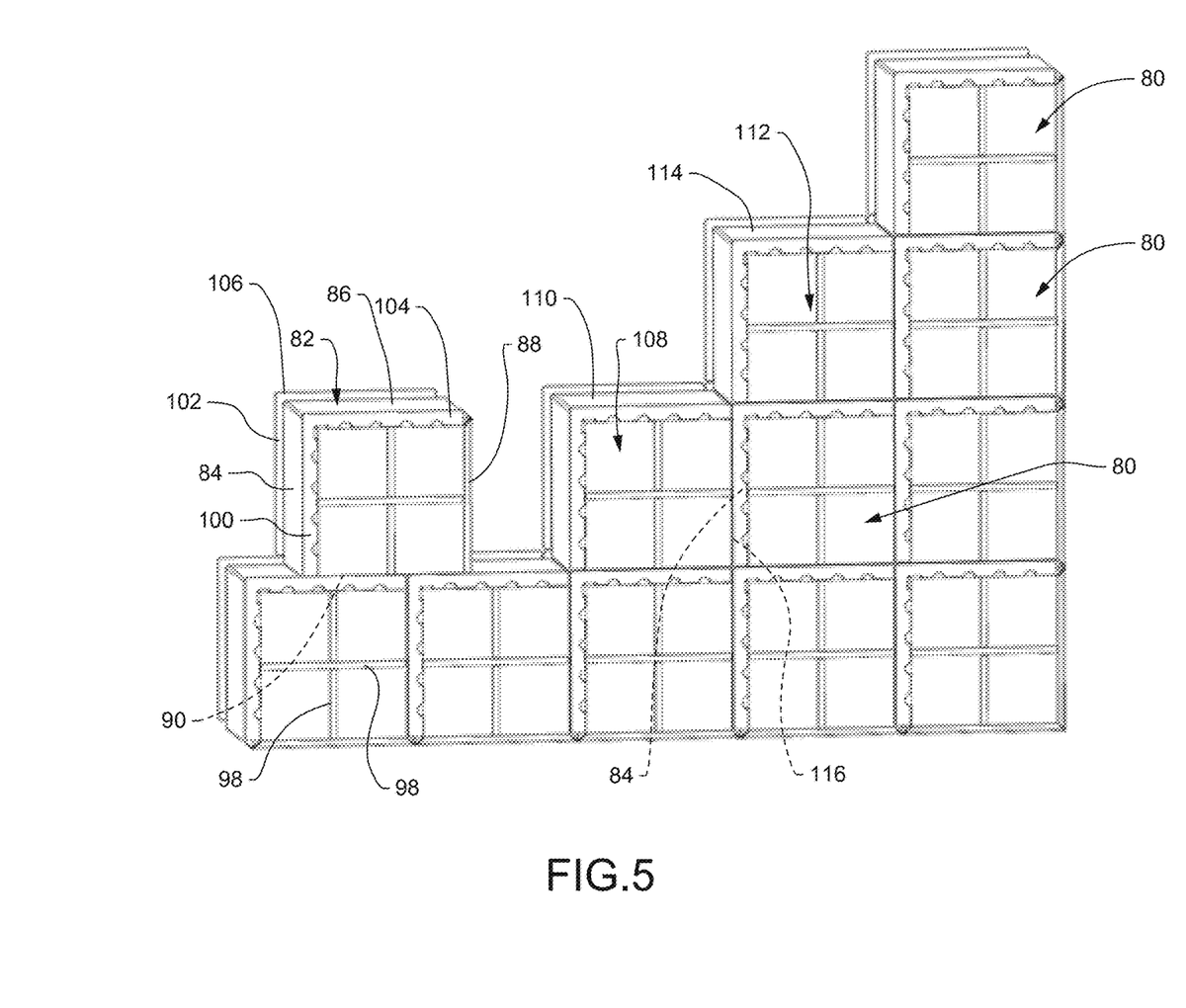
FIG. 5 is a perspective view of an array of catalytic bricks used in the catalytic module of FIG. 4.

In the illustrated embodiment, each of the catalytic bricks 80 has the same construction and configuration. More specifically, as best shown in FIGS. 4-6, each catalytic brick 80 includes a mantle 82 having first, second, third, and fourth side walls 84, 86, 88, 90 extending from a mantle upstream end 92 to a mantle downstream end 94. The side walls 84, 86, 88, 90 may be configured as shown to give the mantle 82 a rectangular or square shape. Accordingly, the first and third side walls 84, 88 are spaced from and substantially parallel to each other. Similarly, the second and fourth walls 86, 90 are spaced from and substantially parallel to each other. The mantle 82 defines a mantle aperture 93, which also may have a rectangular or square shape as shown. A catalyst material 95 is disposed in the brick mantle aperture and is selected to react to the reductant to promote the SCR reduction process.

Each catalytic brick 80 may include four sub-bricks 80a, 80b, 80c, 80d, with a mat 96 disposed between adjacent sub-bricks to reduce leakage. The catalytic brick 80 may further include muntins 98 which overlie the mat 96 to further reduce leakage between sub-bricks (FIG. 5).

The catalytic brick 80 further includes flanges for reducing leakage of exhaust gas through gaps between adjacent bricks. As best shown in FIGS. 5 and 6, a first upstream flange 100 extends outwardly from the first side wall 84 of the brick mantle 82 at the brick mantle upstream end 92, while a first downstream flange 102 extends outwardly from the first side wall 84 at the brick mantle downstream end 94. A second upstream flange 104 extends outwardly from the second side wall 86 of the brick mantle 82 at the brick mantle upstream end 92, while a second downstream flange 106 extends outwardly from the second side wall 86 at the brick mantle downstream end 94. The first downstream flange 102 is sufficiently spaced from the first upstream flange 100 to receive a side wall of a second catalytic brick 108 having a second brick mantle 110 configured the same as the brick mantle 82, as best shown in FIG. 5 Similarly, the second downstream flange 106 is sufficiently spaced from the second upstream flange 104 to receive a side wall of a third catalytic brick 112 having a third brick mantle 114 configured the same as the brick mantle 82. Each of the flanges 100, 102, 104, 106 may be formed of steel and may be welded to the mantle 82.

Horizontally adjacent catalytic bricks 80, 108 may be positioned such that the first side wall 84 of the first catalytic brick 80 is disposed toward a first side wall 116 of the second catalytic brick 108. The first walls 84, 116 define a first brick interface 118 (FIG. 4) between the first catalytic brick 80 and the second catalytic brick 108. The first walls 84, 116 may have complementary shapes, such as the planar, vertically oriented shapes shown in FIGS. 4 and 5, to permit the catalytic bricks 80, 108 to be placed closely adjacent each other in the horizontal direction, thereby reducing a gap in the first brick interface 118. Each of the first upstream flange 100 and first downstream flange 102 may be sized and configured to traverse the first brick interface 118 between the catalytic bricks 80, 108, thereby to reduce leakage through the first brick interface 118. Additionally, an interior mat 122 may be disposed between the catalytic bricks 80, 108 and formed of a compressible and heat resistant seal material to further reduce leakage through the first brick interface 118.

Additionally, vertically adjacent catalytic bricks 80, 112 may be positioned such that the second side wall 86 of the first catalytic brick 80 is disposed toward a first side wall 124 of the third catalytic brick 112. The second wall 86 and the first wall 124 define a second brick interface 126 between the first catalytic brick 80 and the third catalytic brick 112. The second wall 86 and the first wall 124 may have complementary shapes, such as the planar, horizontally oriented shapes shown in FIGS. 4 and 5, to permit the catalytic bricks 80, 112 to be placed closely adjacent each other in the vertical direction, thereby reducing a gap in the second brick interface 126. Each of the second upstream flange 104 and second downstream flange 106 may be sized and configured to traverse the second brick interface 126 between the catalytic bricks 80, 112, thereby to reduce leakage through the second brick interface 126. Additionally, an interior mat 128 may be disposed between the catalytic bricks 80, 112 and formed of a compressible and heat resistant seal material to further reduce leakage through the second brick interface 126.

While the foregoing describes in detail the assembly of three catalytic bricks, it will be appreciated that the array of catalytic bricks may include only two bricks or more than three bricks while still recognizing the advantages taught herein. That is, in any array of bricks having the same construction and configuration as described above with reference to catalytic brick 80, potential leakage between adjacent bricks may be reduced by the upstream and downstream flanges 100, 102, 104, 106.

Flow modulators may be provided for reducing leakage between the catalytic module frame 66 and the catalytic assembly 70 disposed therein. As noted above, and best shown in FIGS. 4, 6 and 7, the catalytic module frame 66 includes the first, second, third, and fourth frame walls 72, 74, 76, 78 bordering on the frame aperture 68. The catalytic assembly 70 may include an array of catalytic bricks 80 as described above. Accordingly, the catalytic assembly 70 may define a composite catalytic assembly mantle 130 formed by the exterior walls of the mantles 82 of the outermost catalytic bricks 80 disposed in the catalytic module frame 66. The composite catalytic assembly mantle 130 may include a first, second, third, and fourth catalytic assembly mantle walls 132, 134, 136, 138 (FIG. 4). The first catalytic assembly mantle wall 132 may be disposed toward the first frame wall 72 to define a first frame interface 140 therebetween. Similarly, the second catalytic assembly mantle wall 134 may be disposed toward the second frame wall 74 to define a second frame interface 142. An exterior mat 143 may be disposed between the catalytic assembly mantle walls and the frame walls that is formed of a compressible and heat resistant seal material.

A first flow modulator 144 is coupled to the catalytic module frame 66 and configured to reduce leakage through the first frame interface 140. More specifically, the first flow modulator 144 includes a body panel 146 defining an inner edge 148 disposed toward the frame aperture 68. As best shown in FIG. 6, the body panel 146 may include an angled portion 146a and a tip portion 146b having a profile complementary to the shape of the first catalytic assembly mantle wall 132. The first flow modulator 144 is movable relative to the catalytic module frame 66 in a first sliding direction (identified by arrow 150) to engage the inner edge 148 with the first catalytic assembly mantle wall 132, so that the body panel 146 traverses the first frame interface 140. To permit movement in the first sliding direction 150, the first flow modulator 144 may include a connection end 152 coupled to the catalytic module frame 66 and having at least one elongate slot 154 sized to receive a fastener 156 that releasably secures the first flow modulator 144 to the catalytic module frame 66. The slot 154 extends in a direction parallel to the first sliding direction 150 to permit movement of the first flow modulator 144 into and out of the frame aperture 68.

Figure 7:
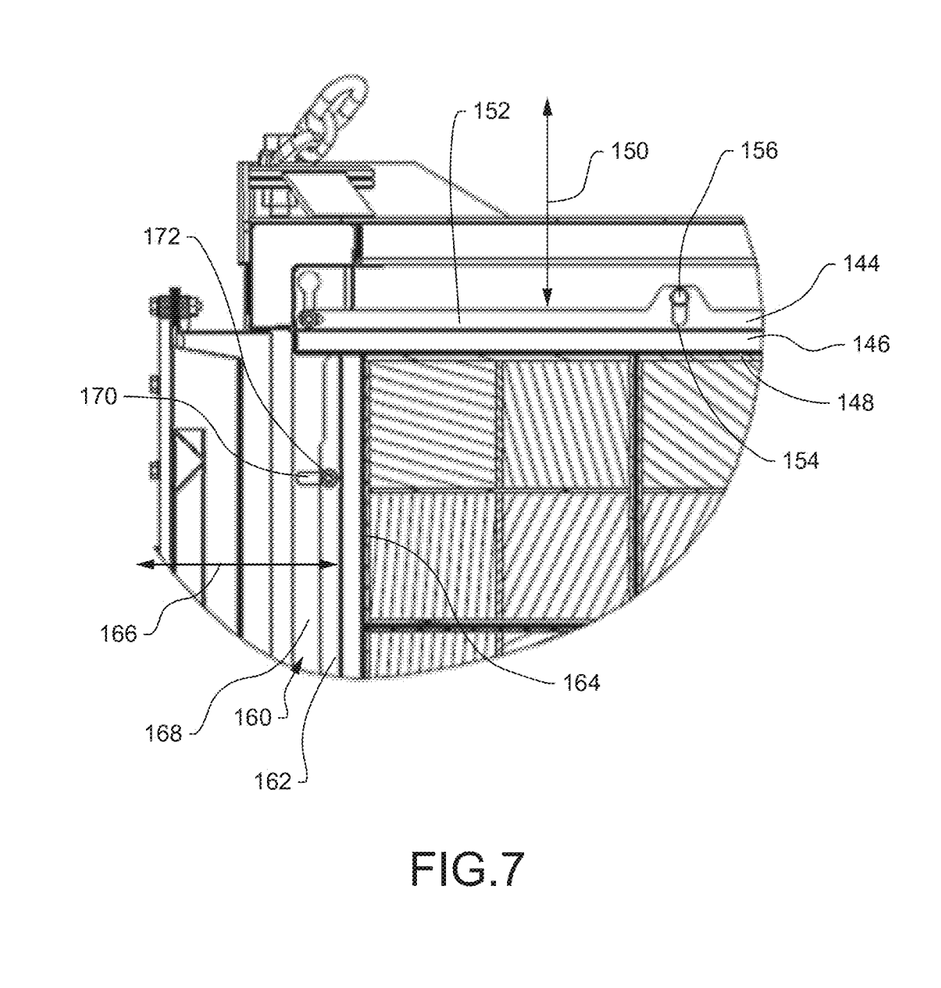
FIG. 7 is an enlarged plan view of a portion of the catalytic module of FIG. 4.

The catalytic module 64 may further include a second flow modulator 160 coupled to the catalytic module frame 66 and configured to reduce leakage through the second frame interface 142. More specifically, the second flow modulator 160 includes a body panel 162 defining an inner edge 164 disposed toward the frame aperture 68. The second flow modulator 160 is movable relative to the catalytic module frame 66 in a second sliding direction (identified by arrow 166) different from the first sliding direction 150, thereby to permit the inner edge 164 to engage the second catalytic assembly mantle wall 134, so that the body panel 162 traverses the second frame interface 142. To permit movement in the second sliding direction 166, the second flow modulator 160 may include a connection end 168 coupled to the catalytic module frame 66 and having at least one elongate slot 170 sized to receive a fastener 172 that releasably secures the second flow modulator 160 to the catalytic module frame 66. The slot 170 extends in a direction parallel to the second sliding direction 166 to permit movement of the second modulator 160 into and out of the frame aperture 68. Both the first and second flow modulators 144, 160 may be formed of stainless steel.

A plenum 180 is located in the second chamber 56 downstream of the catalytic module 64. The plenum 180 receives the exhaust gasses exiting from the catalytic bricks 80 and directs the exhaust gas flow path 48 to the outlet 46 for eventual discharge to atmosphere.

Figure 8:
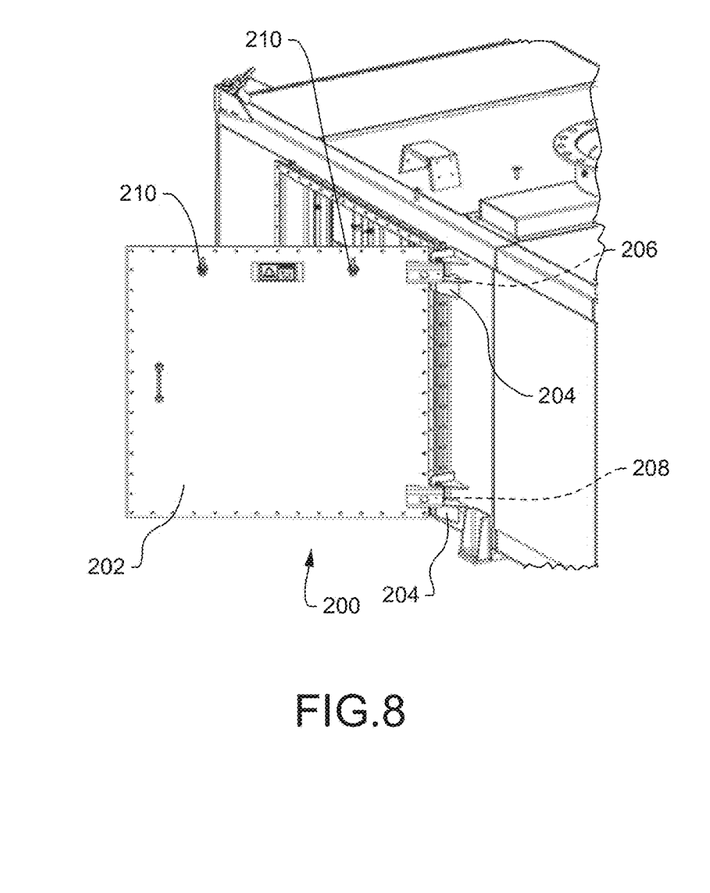
FIG. 8 is a perspective view of a portion of the aftertreatment system showing an SCR hatch in a partially open position.
Figure 9:
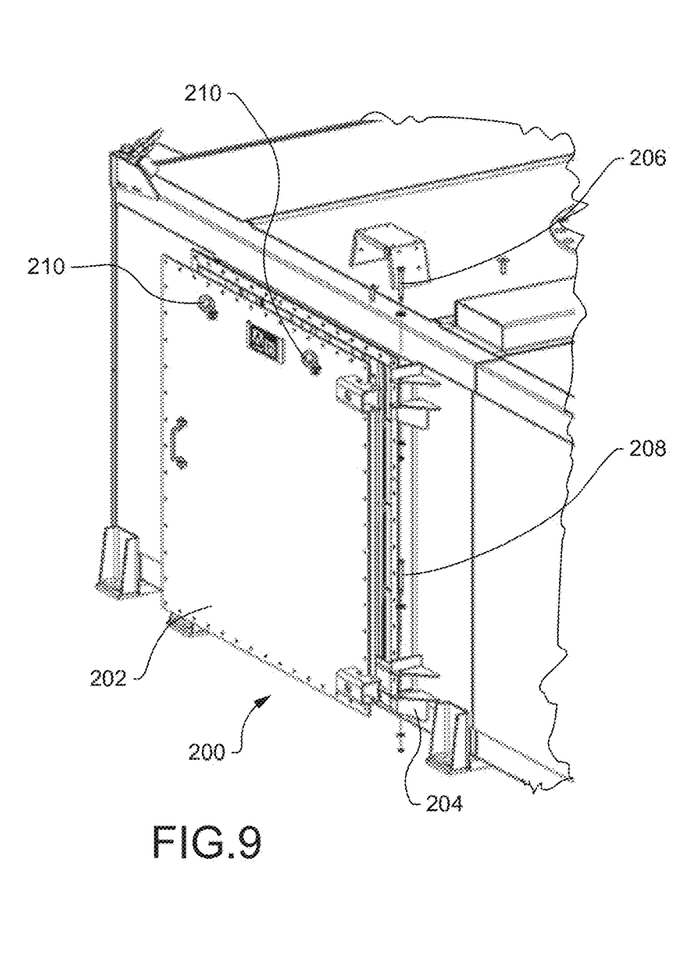
FIG. 9 is a perspective view of a portion of the aftertreatment system showing an SCR hatch in a disassembled position.

The aftertreatment system 40 may also include an SCR hatch 200 which permits access to the catalytic module 64 for maintenance and/or replacement with no or minimal disassembly. As best shown in FIGS. 8 and 9, the SCR hatch 200 includes a door 202 coupled to the housing 42 by hinges 204 configured to permit the door 202 to swing 180° relative to the housing 42. The door 202 may be attached to the hinges 204 by upper and lower fasteners 206, 208. In use, the door 202 may be swung fully open to permit access into the catalytic module 64. Alternatively, if there are space constraints that prevent the door 202 from swinging open, the upper and lower fasteners 206, 208 may be withdrawn from the hinges 204 and the door 202 may be completely removed from the housing 42. To facilitate removal of the door 202, lifting eyes 210 may be provided on the door 202 which permit a crane or other device to support the weight of the door 202 as it is removed.

Figure 10:
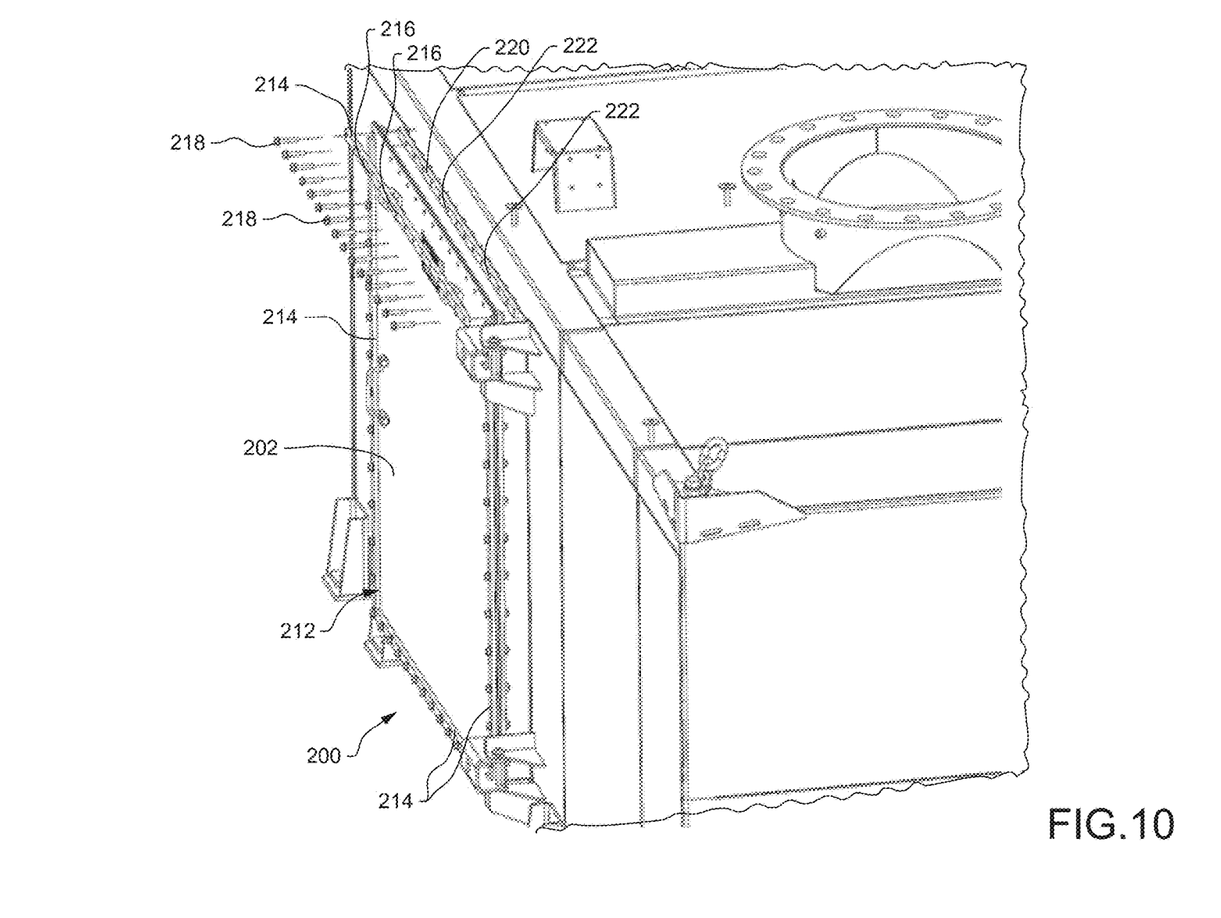
FIG. 10 is a perspective view of a portion of the aftertreatment system showing a sealing system for the SCR hatch.

The SCR hatch 200 may further include fastener bases 212 for facilitating sealing around a perimeter of the door 202, as best illustrated in FIG. 10. More specifically, the fastener bases include door bars 214 extending around a perimeter of the door 202 and having threaded holes 216 for receiving fasteners 218. Additionally, housing bars 220 are coupled to the housing 42 and are aligned with the door bars 214. The housing bars 220 also include threaded holes 222 aligned with the threaded holes 216 of the door bars 214. Thus, the door 202 may be quickly and easily sealed to the housing 42 by securing the fasteners 218 through the threaded holes 216, 222 in the door bars 214 and housing bars 220, respectively.

Figure 11:
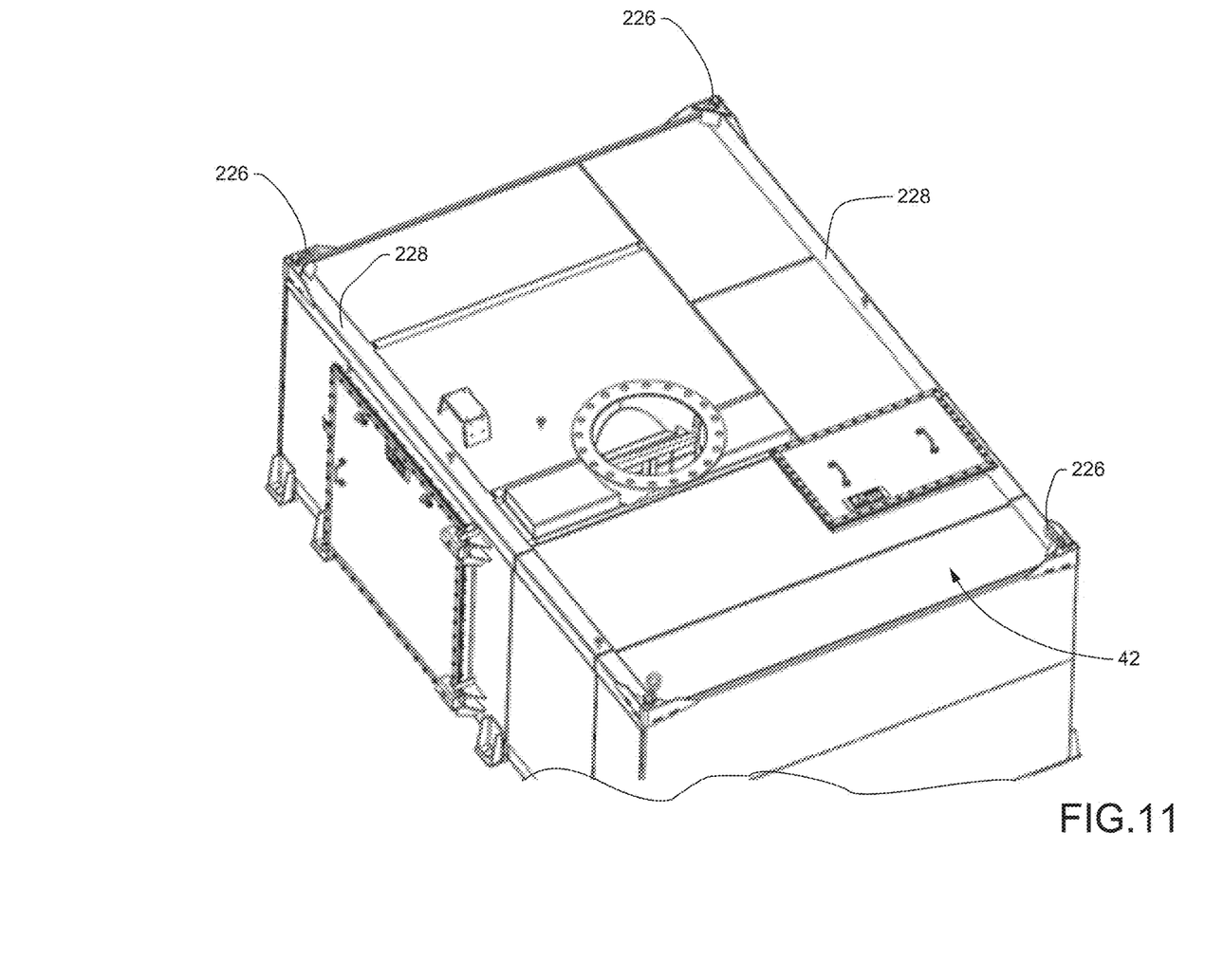
FIG. 11 is a perspective view of a portion of the aftertreatment system showing a top of a housing.

The aftertreatment system 40 may also include lifting eyes 226 and rails 228 facilitate installation, positioning, and repositioning. As best shown in FIG. 11, two rails 228 are coupled to the top lateral edges of the housing 42 to reinforce the housing structure. Bosses (not shown) may be provided on the top of the housing 42 to facilitate attachment of the rails 228 to the housing 42. The lifting eyes 226 are attached to the rails 228 and located at the four corners of the top of the housing 42. A lifting harness (not shown) may be attached to the lifting eyes 226 and used to position the aftertreatment system 40 as desired.

Figure 12:
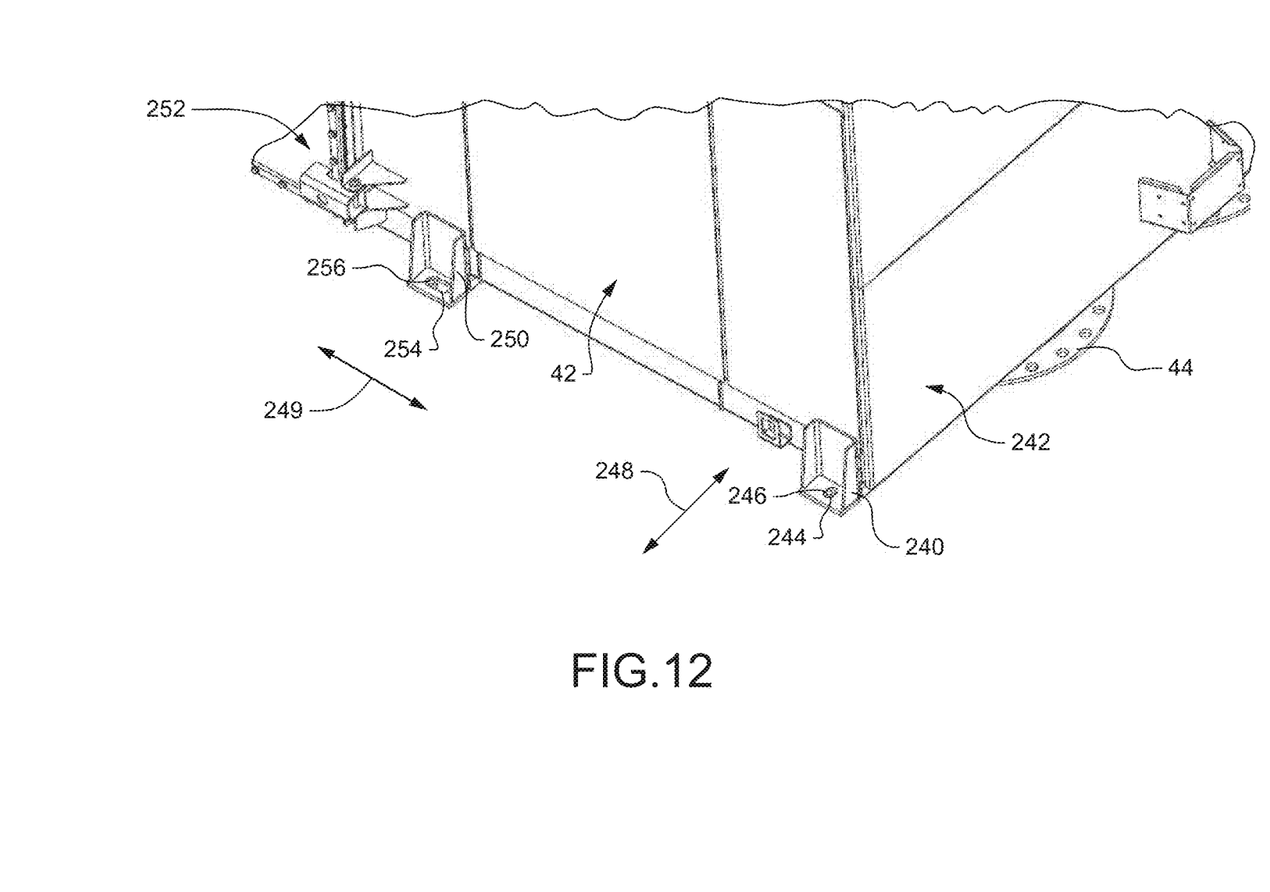
FIG. 12 is an enlarged perspective view of the aftertreatment system showing mounting feet at a bottom of the system.

Still further, the aftertreatment system 40 may include mounting feet configured to accommodate thermal expansion of the aftertreatment system 40 during use, as best shown in FIG. 12. A pair of inlet end mounting feet 240 (FIG. 12 shows the mounting foot 240 on one side of the housing 42, while the other mounting foot 240 is on the opposite side of the housing 42 and substantially aligned with the mounting foot 240 shown in the drawing) are attached to the housing 42 at an inlet end 242 of the housing 42, which is the end of the housing 42 closest to the inlet 44. The inlet end mounting feet 240 include an elongate slot 244 that extends generally radially from the inlet 44. A fastener 246 disposed in the slot 244 is sized to permit movement of the housing 42 in a lateral direction, identified by arrow 248, while preventing movement in a direction perpendicular to the lateral direction, identified herein as the longitudinal direction 249. A pair of outlet end mounting feet 250 (FIG. 12 shows only the outlet end mounting foot 250 on the nearest side of the housing 42) are attached to an outlet end 252 of the housing 42 located nearest the outlet 46. Each of the outlet end mounting feet 250 includes an oversized slot 254 for receiving a fastener 256 sized to permit movement of the housing 42 in both the lateral and longitudinal directions 248, 249. The inlet and outlet end mounting feet 240, 250 as described above allow the housing 42 to thermally expand while securing the inlet 44 in a substantially fixed position, thereby to avoid potential leak issues due to movement of the inlet 44 relative to the power system 20.

INDUSTRIAL APPLICABILITY

Embodiments of aftertreatment systems are described above having catalytic modules that more evenly distribute exhaust gasses across the catalytic bricks by reducing potential bypass leak paths. In some embodiments, the catalytic bricks 80 include flanges 100, 102, 104, 106 configured to reduce leakage between horizontally and/or vertically adjacent catalytic bricks 80. The flanges 100, 102, 104, 106 may further be spaced such that the mantle 82 of a second brick may fit between the flanges of a first brick, thereby partially nesting or interlocking the adjacent catalytic bricks 80. Still further, the mantle 82 may be constructed such that each catalytic brick 80 is free-standing and can support multiple additional bricks that may be stacked on top of the catalytic brick 80, thereby permitting the bricks to be arranged in several different array configurations.

In additional embodiments, the catalytic module frame 66 includes flow modulators 144, 160 configured to reduce potential leak paths between the catalytic bricks 80 and the catalytic module frame 66. The flow modulators 144, 160 are adjustable relative to the frame aperture 68 to accommodate variations in the position and size of the catalytic bricks 80. For example, the original catalytic bricks 80 may require maintenance during which the bricks may be repositioned, or may require replacement by new bricks having slightly different dimensions. The flow modulators 144, 160 permit the effective cross-sectional area of the frame aperture 68 to be adjusted to accommodate such differences while reducing leakage between the catalytic bricks 80 and the catalytic module frame 66.

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A catalytic brick for use in an aftertreatment system having a catalytic module frame defining a frame aperture, the catalytic brick comprising:
    a brick mantle having first, second, third, and fourth side walls extending from a brick mantle upstream end to a brick mantle downstream end, the first side wall being adjacent to the second side wall, the brick mantle defining a brick mantle aperture;
    a catalyst material disposed in the brick mantle aperture;
    a first upstream flange extending outwardly from the first side wall of the brick mantle at the brick mantle upstream end;
    a first downstream flange extending outwardly from the first side wall of the brick mantle at the brick mantle downstream end;
    a second upstream flange extending outwardly from the second side wall of the brick mantle at the brick mantle upstream end;
    a second downstream flange extending outwardly from the second side wall of the brick mantle at the brick mantle downstream end;
    a first peripheral channel formed by the first downstream flange, the first upstream flange, and the first side wall; and
    a second peripheral channel formed by the second downstream flange, the second upstream flange, and the second side wall, and the second peripheral channel adjoining and in direct communication with the first peripheral channel.

2. The catalytic brick of claim 1, in which the first and third walls are spaced from and substantially parallel to each other, and in which the second and fourth walls are spaced from and substantially parallel to each other.

3. The catalytic brick of claim 2, in which the brick mantle has a substantially square profile.

4. The catalytic brick of claim 1, in which each of the first and second upstream flanges and the first and second downstream flanges is formed of steel.

5. The catalytic brick of claim 4, in which each of the first and second upstream flanges and the first and second downstream flanges is welded to the brick mantle.

6. The catalytic brick of claim 1, in which the first downstream flange is sufficiently spaced from the first upstream flange to receive a side wall of a second brick having a second brick mantle configured the same as the brick mantle.

7. The catalytic brick of claim 6, in which the second downstream flange is sufficiently spaced from the second upstream flange to receive a side wall of a third brick having a third brick mantle configured the same as the brick mantle.

8. An array of catalytic bricks for an aftertreatment system, comprising:
    a first catalytic brick including:
        a first brick mantle having a first side wall extending from a first brick mantle upstream end to a first brick mantle downstream end, the first brick mantle defining a first brick mantle aperture; and
        a catalyst material disposed in the first brick mantle aperture; and
    a second catalytic brick disposed adjacent the first side wall of the first brick mantle and including:
        a second brick mantle having a first side wall disposed toward the first side wall of the first brick mantle, the first side wall of the second brick mantle and the first side wall of the first brick mantle defining a first brick interface between the first catalytic brick and the second catalytic brick, the second brick mantle defining a second brick mantle aperture;
        a catalyst material disposed in the second brick mantle aperture;
        a first upstream flange extending outwardly from the first side wall of the second brick mantle at the second brick mantle upstream end; and
        a first downstream flange extending outwardly from the first side wall of the second brick mantle at the second brick mantle downstream end;
        the first downstream flange being sufficiently spaced from the first upstream flange to receive the first side wall of the first brick mantle; and
        each of the first upstream flange and the first downstream flange traverses the first brick interface between the first catalytic brick and the second catalytic brick.

9. The array of catalytic bricks of claim 8, in which each of the first brick mantle and the second brick mantle has a square shape.

10. The array of catalytic bricks of claim 8, in which:
   the second brick mantle further comprises a second side wall adjacent the first side wall; and
   the second catalytic brick further includes:
      a second upstream flange extending outwardly from the second side wall of the second brick mantle at the second brick mantle upstream end; and
      a second downstream flange extending outwardly from the second side wall of the second brick mantle at the second brick mantle downstream end.

11. The array of catalytic bricks of claim 10, further comprising a third catalytic brick disposed adjacent the second side wall of the second brick mantle and including a third brick mantle having a first side wall extending from a third brick mantle upstream end to a third brick mantle downstream end, the third brick mantle defining a third brick mantle aperture;
   a catalyst material disposed in the third brick mantle aperture;
   the second side wall of the second brick mantle and the first side wall of the third brick mantle defining a second brick interface between the second catalytic brick and the third catalytic brick; the second downstream flange being sufficiently spaced from the second upstream flange to receive the first side wall of the third brick mantle; and
   each of the second upstream flange and the second downstream flange being configured to traverse the second brick interface between the second catalytic brick and the third catalytic brick.

12. The array of catalytic bricks of claim 11, in which the first side wall of the second brick mantle extends vertically and the second side wall of the second brick mantle extends horizontally.

\* \* \* \* \*